US012525164B2

(12) United States Patent
Pyun et al.

(10) Patent No.: US 12,525,164 B2
(45) Date of Patent: Jan. 13, 2026

(54) DISPLAY DEVICE AND METHOD OF DRIVING DISPLAY DEVICE

(71) Applicant: Samsung Display Co., LTD., Yongin-si (KR)

(72) Inventors: Kihyun Pyun, Yongin-si (KR); Jungeon An, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/969,643

(22) Filed: Dec. 5, 2024

(65) Prior Publication Data

US 2025/0273113 A1 Aug. 28, 2025

(30) Foreign Application Priority Data

Feb. 28, 2024 (KR) ........................ 10-2024-0028503

(51) Int. Cl.
*G09G 3/20* (2006.01)

(52) U.S. Cl.
CPC ..... *G09G 3/2007* (2013.01); *G09G 2310/027* (2013.01); *G09G 2320/0276* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 11,127,345 B1 * | 9/2021 | Seo | G09G 3/3233 |
| 11,189,234 B2 * | 11/2021 | Pyun | G09G 3/3233 |
| 2015/0255019 A1 * | 9/2015 | Park | G09G 3/3225 345/208 |

FOREIGN PATENT DOCUMENTS

| | | |
|---|---|---|
| KR | 10-0352908 A | 9/2002 |
| KR | 10-0421869 A | 3/2004 |
| KR | 10-0565636 A | 3/2006 |
| KR | 10-0648671 A | 11/2006 |

* cited by examiner

*Primary Examiner* — Matthew Yeung
(74) *Attorney, Agent, or Firm* — Womble Bond Dickinson (US) LLP

(57) ABSTRACT

A display device includes a display panel, a power voltage generator, and a driving controller. The display panel displays a plurality of frame images based on input image data. The power voltage generator provides a power voltage to the display panel. The driving controller generates a load reference value based on a voltage level of the power voltage and a scale factor for adjusting grayscales of the plurality of frame images, generates at least one of a first signal or a second signal for controlling a power current by comparing the load reference value with a plurality of line loads associated with a plurality of line images, and performs at least one of a first operation for reducing the scale factor based on the first signal or a second operation for reducing the voltage level of the power voltage based on the second signal.

20 Claims, 10 Drawing Sheets

200a

200b

DISPLAY DEVICE AND METHOD OF DRIVING DISPLAY DEVICE

CROSS-REFERENCE TO RELATED APPLICATION(S)

The present application claims priority to and the benefit of Korean Patent Applications No. 10-2024-0028503, filed on Feb. 28, 2024 in the Korean Intellectual Property Office (KIPO), the entire disclosure of which is incorporated herein by reference.

BACKGROUND

1. Field

Aspects of some embodiments relate generally to display devices and methods of driving the display devices.

2. Description of the Related Art

Generally, a display device may include a display panel, a driving controller, a gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The driving controller may control the gate driver and the data driver.

When luminance of the display panel is not adjusted according to a load of input image data, an overcurrent may flow through the data driver and/or the display panel, which may damage the data driver and/or the display panel.

A delay of one frame may occur when determining the load of input image data. Due to the delay of one frame, when input image data that does not require a luminance adjustment function is input in an (N−1)-th frame and when input image data that requires the luminance adjustment function is input in an N-th frame, the luminance adjustment function may not immediately operate in the N-th frame, so that an overcurrent may flow through the display panel during the N-th frame. As a result, the display panel and/or the data driver may be damaged.

The above information disclosed in this Background section is only for enhancement of understanding of the background and therefore the information discussed in this Background section does not necessarily constitute prior art.

SUMMARY

Aspects of some embodiments relate generally to a system and method for displaying images, and for example, to display devices and methods of driving the display devices.

Aspects of some embodiments include a display device capable of preventing or reducing damage of a display panel due to an overcurrent Aspects of some embodiments include a method of driving a display device capable of preventing or reducing damage of a display panel due to an overcurrent According to some embodiments, a display device includes a display panel, a power voltage generator, and a driving controller. The display panel displays a plurality of frame images based on input image data. The power voltage generator provides a power voltage to the display panel. The driving controller generates a load reference value based on a voltage level of the power voltage and a scale factor for adjusting grayscales of the plurality of frame images, generates at least one of a first signal or a second signal by comparing the load reference value with a plurality of line loads associated with a plurality of line images, and performs at least one of a first operation for reducing the scale factor based on the first signal or a second operation for reducing the voltage level of the power voltage based on the second signal. The first signal and the second signal are used for controlling a power current flowing through the display panel. The plurality of line images are included in each of the plurality of frame images.

According to some embodiments, the driving controller may include a net power controller, a load reference value calculator, a line load comparator, and a power voltage code generator. The net power controller may receive the input image data, may output a plurality of frame loads associated with the plurality of frame images, may output the plurality of line loads associated with the plurality of line images, may output the scale factor based on the plurality of frame loads, and may perform the first operation based on the first signal. The load reference value calculator may output the load reference value based on the scale factor, the voltage level of the power voltage and a load reference value look-up table. The line load comparator may output at least one of the first signal or the second signal by comparing the load reference value with the plurality of line loads. The power voltage code generator may output a power voltage code for determining the voltage level of the power voltage based on the plurality of frame loads, maximum grayscales of the plurality of frame images and a voltage code look-up table, and may perform the second operation for controlling the power voltage code based on the second signal.

According to some embodiments, the net power controller may include a line unit calculator, a line load calculator, and a grayscale controller. The line unit calculator may receive the input image data, may calculate a sum of grayscales of each of the plurality of frame images, and may calculate a sum of grayscales of each of the plurality of line images. The line load calculator may calculate the plurality of frame loads associated with the plurality of frame images based on the sum of the grayscales of each of the plurality of frame images, and may calculate the plurality of line loads associated with the plurality of line images based on the sum of the grayscales of each of the plurality of line images. The grayscale controller may output the scale factor based on the plurality of frame loads, and may perform the first operation based on the first signal.

According to some embodiments, the load reference value may be inversely proportional to the voltage level of the power voltage and the scale factor.

According to some embodiments, the driving controller may further include a maximum grayscale calculator. The maximum grayscale calculator may receive the input image data, and may calculate the maximum grayscales of the plurality of frame images.

According to some embodiments, the voltage level of the power voltage may increase as the frame load increases, and the voltage level of the power voltage may increase as the maximum grayscale increases.

According to some embodiments, the power voltage generator may include a power supply circuit, a digital-to-analog (DA) converter, and a power voltage output circuit. The power supply circuit may provide an input voltage. The DA converter may generate a compensation voltage based on the power voltage code. The power voltage output circuit may output the power voltage based on the input voltage and the compensation voltage.

According to some embodiments, the display device may further include a data driver. The data driver may provide a plurality of data voltages to a plurality of data lines for driving the display panel.

According to some embodiments, the driving controller and the data driver may be formed integrally with each other.

According to some embodiments, the display device may further include a gate driver. The gate driver may provide a plurality of gate signals to a plurality of gate lines for driving the display panel.

According to some embodiments, in a method of driving a display device including a display panel displaying a plurality of frame images based on input image data, a load reference value is generated based on a voltage level of a power voltage provided to the display panel and a scale factor for adjusting grayscales of the plurality of frame images. At least one of a first signal or a second signal is generated by comparing the load reference value with a plurality of line loads associated with a plurality of line images. The first signal and the second signal are used for controlling a power current flowing through the display panel. The plurality of line images are included in each of the plurality of frame images. At least one of a first operation for reducing the scale factor based on the first signal or a second operation for reducing the voltage level of the power voltage based on the second signal is performed.

According to some embodiments, when generating the load reference value, the input image data may be received. The scale factor may be output based on the input image data. A power voltage code for determining the voltage level of the power voltage may be output based on the input image data. The load reference value may be output based on the scale factor, the voltage level of the power voltage corresponding to the power voltage code, and a load reference value look-up table.

According to some embodiments, when outputting the scale factor, a sum of grayscales of each of the plurality of frame images may be calculated. A plurality of frame loads associated with the plurality of frame images may be calculated based on the sum of the grayscales of each of the plurality of frame images. The scale factor may be obtained based on the plurality of frame loads.

According to some embodiments, when outputting the power voltage code, maximum grayscales of the plurality of frame images may be calculated. The power voltage code may be obtained based on the plurality of frame loads, the maximum grayscales of the plurality of frame images, and a voltage code look-up table.

According to some embodiments, the voltage level of the power voltage may increase as the frame load increases, and the voltage level of the power voltage may increase as the maximum grayscale increases.

According to some embodiments, the load reference value may be inversely proportional to the voltage level of the power voltage and the scale factor.

According to some embodiments, when generating at least one of the first signal or the second signal, the input image data may be received. The plurality of line loads may be output based on the input image data. The plurality of line loads may be compared with the load reference value. At least one of the first signal or the second signal may be output when the plurality of line loads are greater than or equal to the load reference value.

According to some embodiments, when outputting the plurality of line loads, a sum of grayscales of each of the plurality of line images may be calculated. The plurality of line loads associated with the plurality of line images may be calculated based on the sum of the grayscales of each of the plurality of line images.

According to some embodiments, the scale factor may be immediately reduced when the first operation is performed based on the first signal.

According to some embodiments, when performing at least one of the first operation or the second operation, a power voltage code for reducing the voltage level of the power voltage may be generated based on the second signal. The voltage level of the power voltage may be immediately reduced when the second operation is performed based on the power voltage code.

In the display device and the method of driving the display device according to some embodiments, the time point when the overcurrent is expected to flow through the display panel may be detected using the line loads associated with the input image data, and the scale factor and/or the power voltage may be controlled to prevent or reduce the overcurrent. Accordingly, the period or cycle for detecting when the overcurrent is expected to flow through the display panel may be relatively short, and thus the damage of the display panel due to the overcurrent may be efficiently prevented or reduced.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
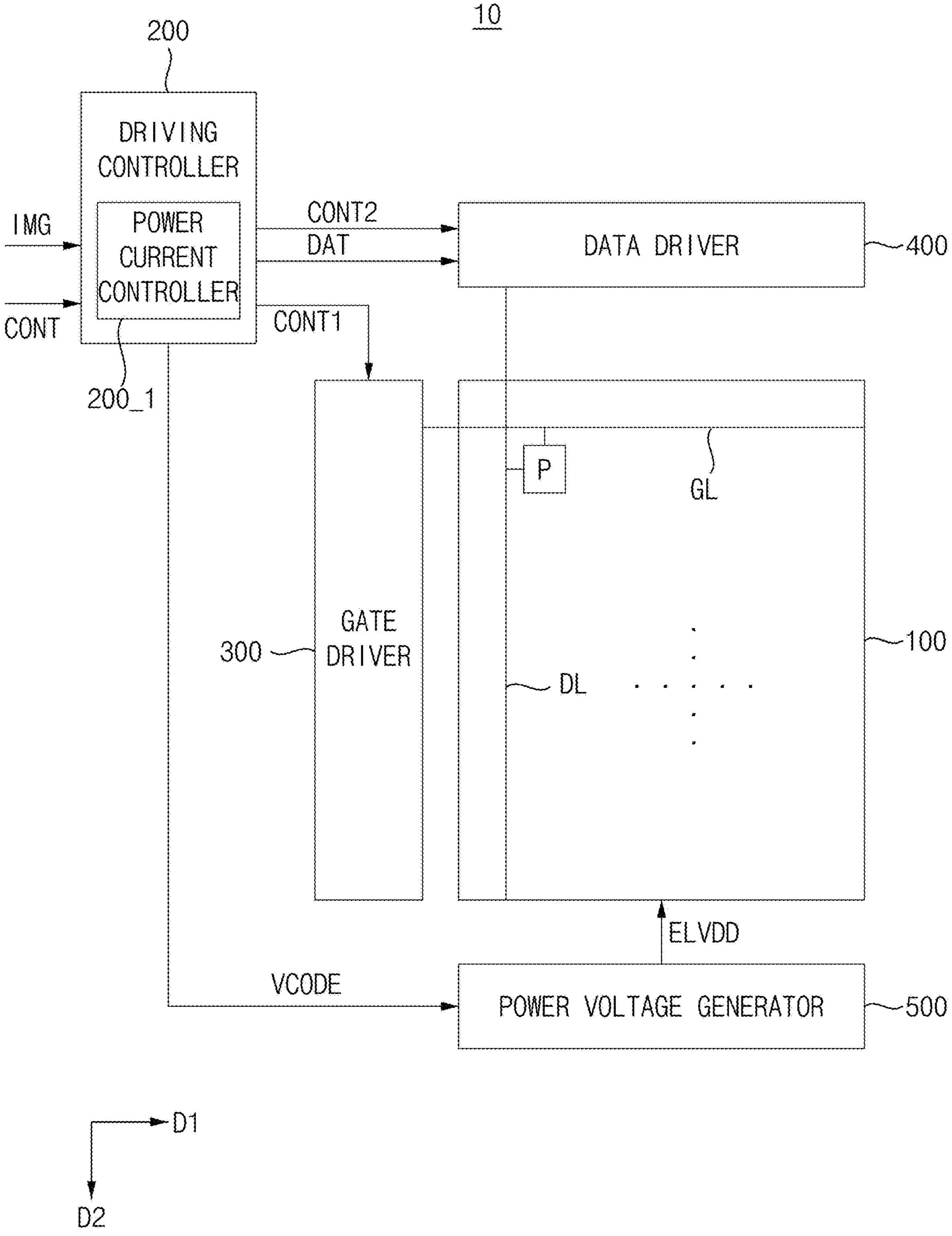
FIG. 1 is a block diagram illustrating a display device according to some embodiments.

Aspects of some embodiments are described more fully hereinafter with reference to the accompanying drawings. Like or similar reference numerals refer to like or similar elements throughout.

FIG. 1 is a block diagram illustrating a display device according to some embodiments.

Referring to FIG. 1, a display device 10 may include a display panel 100 and a display panel driver. The display panel driver may include a driving controller 200, a gate driver 300, a data driver 400 and a power voltage generator 500.

For example, the driving controller 200 and the data driver 400 may be formed integrally with each other, or may be defined by portions of a single module or chip. For example, a driving module in which at least the driving controller 200 and the data driver 400 are formed integrally with each other may be referred to as a timing controller-embedded data driver (TED).

The display panel 100 may include a display region for displaying an image, and a peripheral region adjacent to (e.g., surrounding) the display region.

The display panel 100 may include a plurality of gate lines GL, a plurality of data lines DL, and a plurality of pixels P electrically connected to the plurality of gate lines GL and the plurality of data lines DL, respectively. The plurality of gate lines GL may extend in a first direction D1, and the plurality of data lines DL may extend in a second direction D2 crossing (e.g., substantially perpendicular to) the first direction D1.

The driving controller 200 may receive input image data IMG and an input control signal CONT from an external device, e.g., a host device or a graphic processor. For example, the input image data IMG may include red image data, green image data, and blue image data. For example, the input image data IMG may include white image data. For example, the input image data IMG may include magenta image data, yellow image data, and cyan image data. For example, the input control signal CONT may include a master clock signal and a data enable signal. For example, the input control signal CONT may further include a vertical synchronization signal and a horizontal synchronization signal.

For example, the input image data IMG may include information associated with or related to a plurality of frame images. Each of the plurality of frame images may include a plurality of line images. In other words, the plurality of line images may constitute one frame image. For example, in ultra high-definition (UHD) display devices, one frame image may include 2160 line images.

The driving controller 200 may generate a first control signal CONT1, a second control signal CONT2, a power voltage code VCODE, and a data signal DAT based on the input image data IMG and the input control signal CONT.

The driving controller 200 may generate the first control signal CONT1 for controlling an operation of the gate driver 300 based on the input control signal CONT to output the first control signal CONT1 to the gate driver 300. For example, the first control signal CONT1 may include a vertical start signal and a gate clock signal.

The driving controller 200 may generate the second control signal CONT2 for controlling an operation of the data driver 400 based on the input control signal CONT to output the second control signal CONT2 to the data driver 400. For example, the second control signal CONT2 may include a horizontal start signal and a load signal.

The driving controller 200 may generate the data signal DAT based on the input image data IMG. The driving controller 200 may output the data signal DAT to the data driver 400.

The driving controller 200 may include a power current controller 200_1 that generates the power voltage code VCODE according to some embodiments.

Configurations of the driving controller 200 and the power current controller 200_1 will be described in more detail with reference to FIGS. 3 and 4.

The gate driver 300 may generate a plurality of gate signals for driving the plurality of gate lines GL in response to the first control signal CONT1 received from the driving controller 200. The gate driver 300 may output the plurality of gate signals to the plurality of gate lines GL. For example, the gate driver 300 may sequentially output the plurality of gate signals to the plurality of gate lines GL. For example, the gate driver 300 may be mounted on the peripheral region of the display panel 100. Alternatively, the gate driver 300 may be integrated on the peripheral region of the display panel 100.

The data driver 400 may receive the second control signal CONT2 and the data signal DAT from the driving controller 200. The data driver 400 may convert the data signal DAT (e.g., digital data) into a plurality of data voltages (e.g., analog voltages). The data driver 400 may output the plurality of data voltages to the plurality of data lines DL.

The power voltage generator 500 may generate a voltage for driving at least one of the display panel 100, the driving controller 200, the gate driver 300, or the data driver 400. For example, the power voltage generator 500 may generate a low power voltage, and may output the low power voltage to the plurality of pixels P. For example, the power voltage generator 500 may generate an analog power voltage, and may output the analog power voltage to the data driver 400. For example, the power voltage generator 500 may generate a high gate voltage and a low gate voltage, and may output the high gate voltage and the low gate voltage to the gate driver 300. According to some embodiments, the power voltage generator 500 may include a DC-DC converter.

According to some embodiments, the power voltage generator 500 may receive the power voltage code VCODE from the driving controller 200. The power voltage generator 500 may generate a first power voltage ELVDD based on the power voltage code VCODE. The power voltage generator 500 may output the first power voltage ELVDD to the display panel 100.

A configuration of the power voltage generator 500 will be described in detail with reference to FIG. 10.

Figure 2:
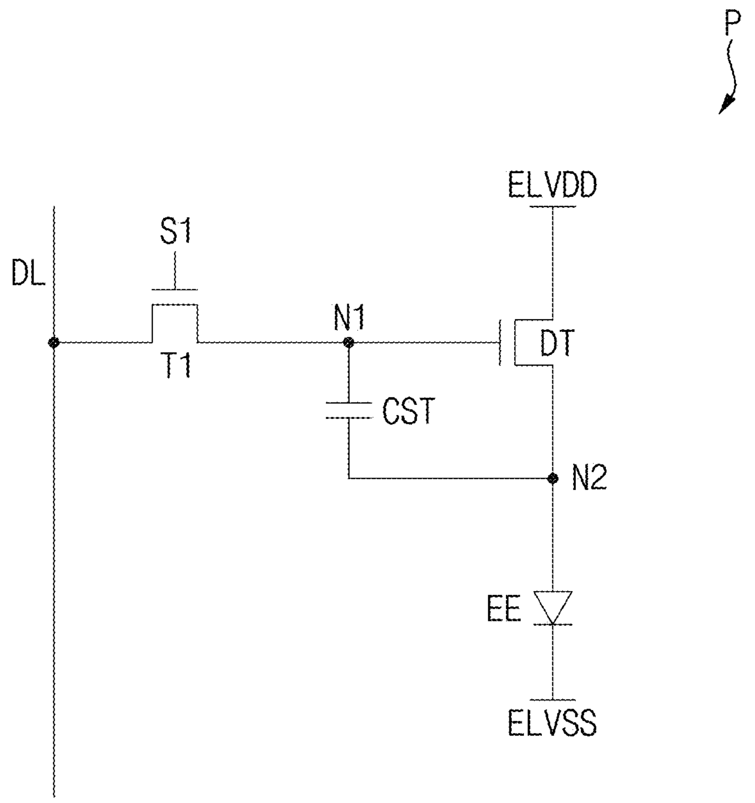
FIG. 2 is a circuit diagram illustrating an example of each pixel included in a display device according to some embodiments.

FIG. 2 is a circuit diagram illustrating an example of each pixel included in a display device according to some embodiments. Although FIG. 2 illustrates various components in a pixel circuit, embodiments according to the present disclosure are not limited thereto. For example, according to some embodiments, the pixel circuit may include additional components without departing from the spirit and scope of embodiments according to the present disclosure.

Referring to FIG. 2, each of the plurality of pixels P may include a first switching transistor T1, a storage capacitor CST, a driving transistor DT, and a light emitting element EE. The first switching transistor T1 may apply a data voltage to a control electrode of the driving transistor DT (e.g., a first node N1) in response to a first gate signal S1. The storage capacitor CST may store the data voltage. The driving transistor DT may generate a driving current in response to the data voltage. The light emitting element EE may emit light based on the driving current.

For example, the first switching transistor T1 may include a control electrode that receives the first gate signal S1, an input electrode connected to the data line DL, and an output electrode connected to the first node N1. For example, the storage capacitor CST may include a first electrode connected to the first node N1, and a second electrode connected to a second node N2. For example, the driving transistor DT may include the control electrode connected to the first node N1, an input electrode that receives the first power voltage ELVDD, and an output electrode connected to the second node N2. For example, the light emitting element EE may include a first electrode connected to the second node N2, and a second electrode that receives a second power voltage ELVSS.

Figure 3:
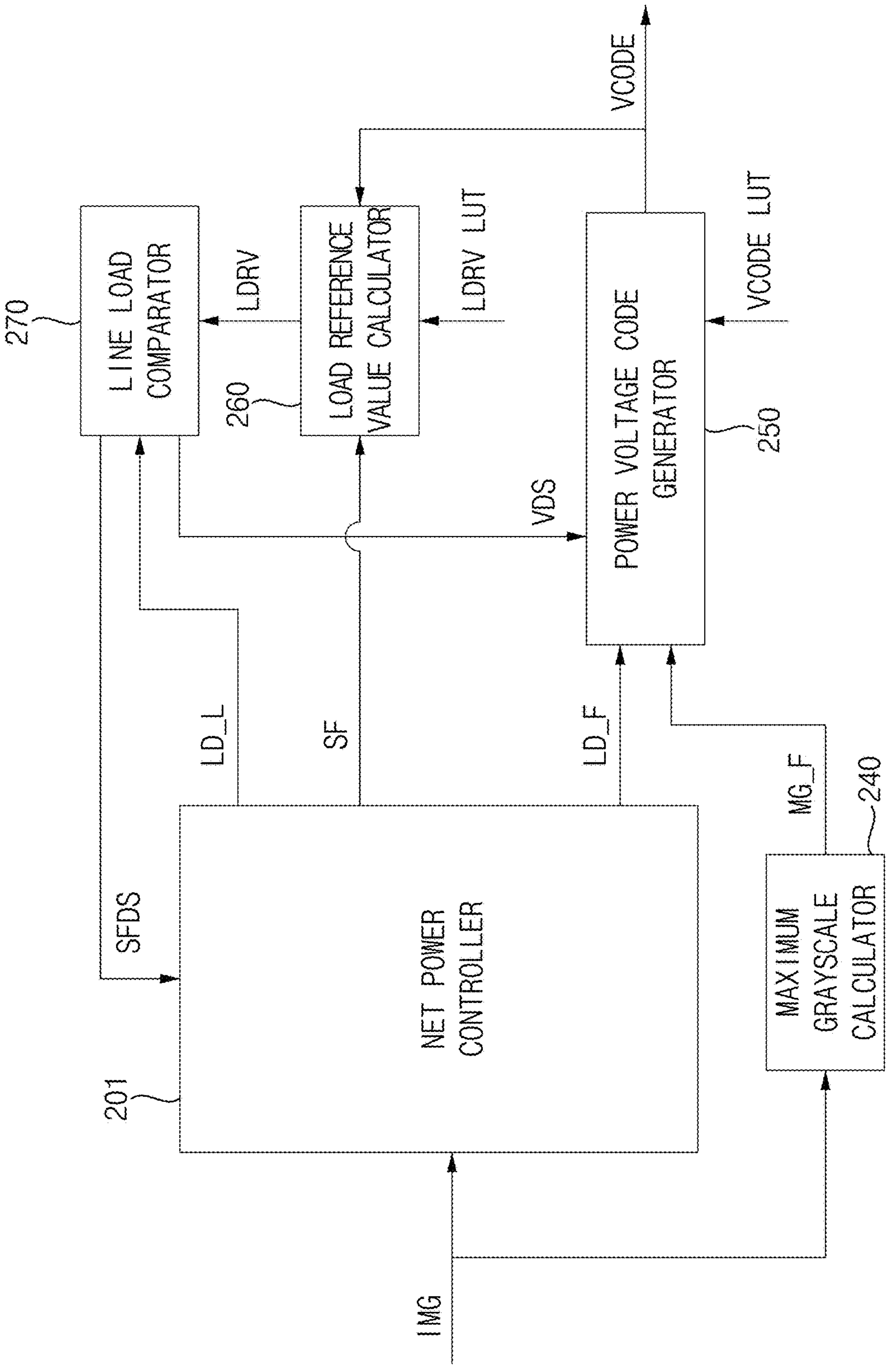
FIG. 3 is a block diagram illustrating an example of a driving controller included in a display device according to some embodiments.

FIG. 3 is a block diagram illustrating an example of a driving controller included in a display device according to some embodiments.

Referring to FIG. 3, a driving controller 200*a* may include a net power controller 201, a power voltage code generator 250, a load reference value calculator 260, and a line load comparator 270. The driving controller 200*a* may further include a maximum grayscale calculator 240. For example, some or all of the components 201, 240, 250, 260 and 270 in FIG. 3 may correspond to the power current controller 200_1 in FIG. 1.

The net power controller 201 may receive the input image data IMG. For example, the plurality of frame images may be displayed on the display panel 100 based on the input image data IMG. For example, as described with reference to FIG. 1, each of the plurality of frame images may include the plurality of line images.

The net power controller 201 may output a plurality of frame loads LD_F associated with the plurality of frame images, and may output a plurality of line loads LD_L associated with the plurality of line images. For example, the plurality of frame loads LD_F may be used to generate a scale factor SF, and may be used to generate the power voltage code VCODE. For example, the plurality of line loads LD_L may be used to generate a first signal SFDS or a second signal VDS.

The net power controller 201 may generate the scale factor SF based on the plurality of frame loads LD_F. For example, the net power controller 201 may control or adjust the scale factor SF when the plurality of frame loads LD_F exceed a limit load. For example, the scale factor SF may be adjusted such that a product of the plurality of frame loads LD_F and luminance (or brightness) of the display panel 100 corresponds to a constant value. Because it requires a certain amount of time for the net power controller 201 to determine the plurality of frame loads LD_F, there may be a delay corresponding to one frame image from a time point at which the input image data IMG is received to a time point at which the scale factor SF is adjusted. For example, when a load of a first frame image displayed in a first frame interval is greater than the limited load, the scale factor SF may be adjusted in a second frame interval for displaying a second frame image subsequent to the first frame image. Such operation of controlling or adjusting the scale factor SF when the plurality of frame loads LD_F are greater than the limit load may be referred to as a net power adjustment operation. For example, the net power adjustment operation may be performed in units of frames (or per frame).

For example, the scale factor SF may be used to control or adjust grayscale of the input image data IMG. For example, the scale factor SF may be output to the load reference value calculator 260, and may be used to generate a load reference value LDRV. For example, the scale factor SF may be generated or updated per frame when the first signal SFDS is deactivated or disabled. For example, when the first signal SFDS is deactivated, it may represent or indicate that an overcurrent is not expected to flow through the display panel 100.

The net power controller 201 may perform a first operation for reducing the scale factor SF based on the first signal SFDS. For example, the net power controller 201 may reduce the scale factor SF immediately when receiving the first signal SFDS. For example, the scale factor SF may be reduced when the first signal SFDS is activated. Unlike the net power adjustment operation, the first operation may not be performed in units of frames. For example, the first signal SFDS may be activated and/or deactivated in units of lines (or per every line), and the first operation may be performed based on the activation of the first signal SFDS. In other words, the first operation may be performed in units of lines.

The power voltage code generator 250 may output the power voltage code VCODE for determining the voltage level of the power voltage based on the plurality of frame loads LD_F, maximum grayscales MG_F of the plurality of frame images, and a voltage code look-up table VCODE LUT. For example, the power voltage code VCODE may include both a code for generating the first power voltage ELVDD in FIG. 2 and a code for generating the second power voltage ELVSS in FIG. 2. For convenience of description, only the operation related to the code for generating the first power voltage ELVDD will be described, and the power voltage may correspond to the first power voltage ELVDD. The operation of generating the power voltage using the power voltage code VCODE will be described with reference to FIG. 10.

For example, the power voltage code VCODE may be output to the power voltage generator 500, and may be used to generate the power voltage. For example, the power voltage code VCODE may be output to the load reference value calculator 260, and may be used to generate the load reference value LDRV. The voltage code look-up table VCODE LUT will be described with reference to FIGS. 8 and 9. For example, the power voltage code VCODE may be generated or updated per frame when the second signal VDS is deactivated or disabled. For example, when the second signal VDS is deactivated, it may represent or indicate that an overcurrent is not expected to flow through the display panel 100.

The power voltage code generator 250 may perform a second operation for controlling the power voltage code VCODE based on the second signal VDS. For example, the power voltage code generator 250 may change the power voltage code VCODE such that the voltage level of the power voltage is reduced immediately when receiving the second signal VDS. For example, the power voltage code VCODE may be changed when the second signal VDS is activated. Unlike the net power adjustment operation, the second operation may not be performed in units of frames. For example, the second signal VDS may be activated and/or deactivated in units of lines (or per every line), and the second operation may be performed based on the activation of the second signal VDS. In other words, the second operation may be performed in units of lines. According to some embodiments, the voltage level of the power voltage may be reduced by linearly driving a transistor used to generate the power voltage.

The load reference value calculator 260 may output the load reference value LDRV based on the scale factor SF, the power voltage code VCODE, and a load reference value look-up table LDRV LUT. For example, the load reference value LDRV may be calculated in units of frames. The load reference value look-up table LDRV LUT will be described with reference to FIG. 8.

The line load comparator 270 may output at least one of the first signal SFDS or the second signal VDS by comparing the load reference value LDRV with the plurality of line loads LD_L. For example, the plurality of line loads LD_L may represent loads associated with the plurality of line images. For example, when one frame image includes 2160 line images, a load of a single line image among the 2160 line images may be defined as a single line load. For example, when the plurality of line loads LD_L increase, a power current flowing through the display panel 100 may increase, and then the power current may become an overcurrent. To control the power current, at least one of the first signal SFDS or the second signal VDS may be output when the plurality of line loads LD_L are greater than or equal to the load reference value LDRV. For example, the first signal SFDS may be transmitted to the net power controller 201, and the first operation may be performed based on the first signal SFDS. For example, the second signal VDS may be transmitted to the power voltage code generator 250, and the second operation may be performed based on the second signal VDS. The first operation and the second operation will be described with reference to FIGS. 6 and 7.

The maximum grayscale calculator 240 may receive the input image data IMG, and may calculate the maximum grayscales MG_F of the plurality of frame images in the input image data IMG. For example, when a first frame image among the plurality of frame images includes 0 grayscale to 255 grayscale, the maximum grayscale calculator 240 may calculate the maximum grayscale of the first frame image as 255 grayscale.

Figure 4:
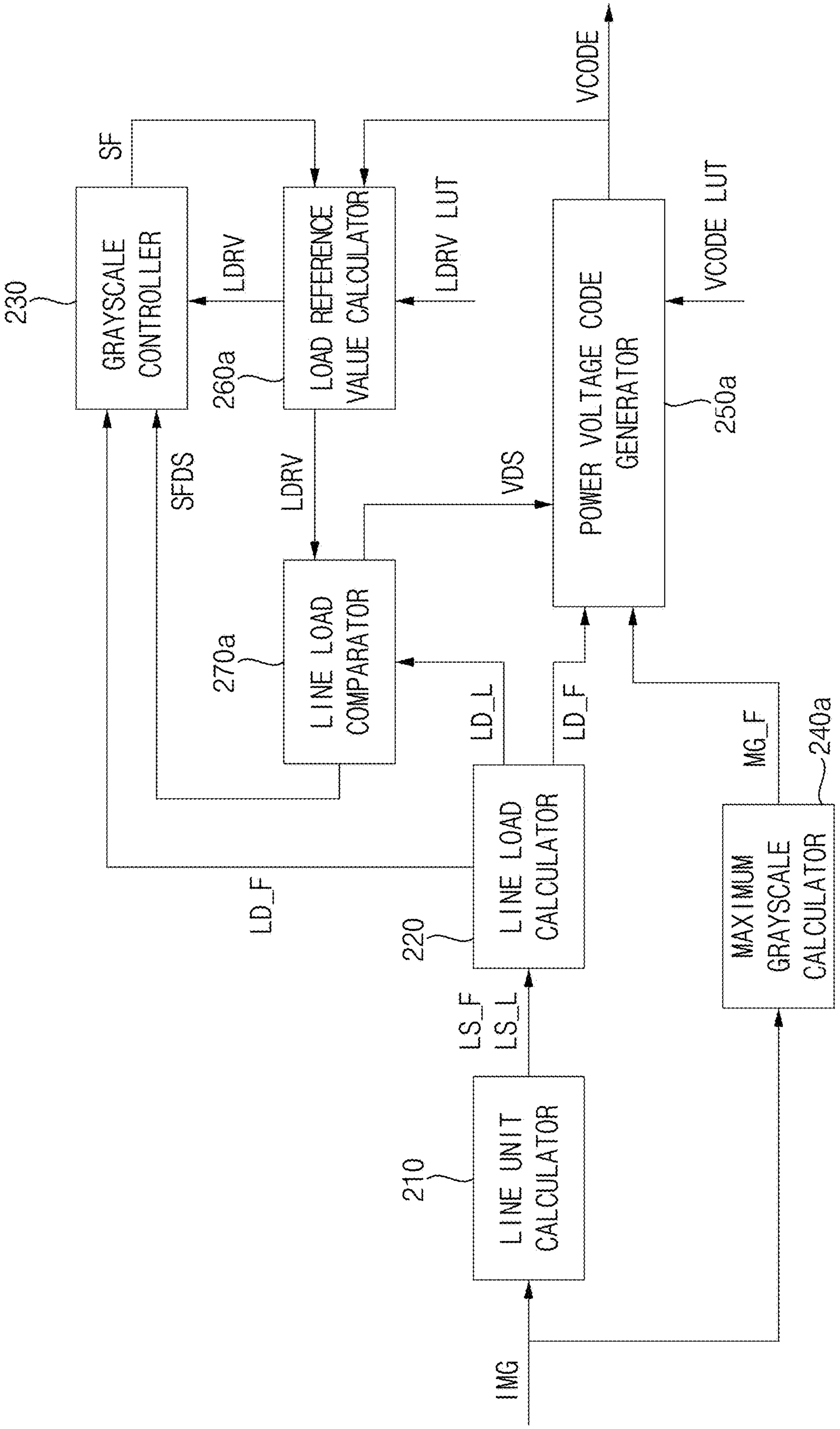
FIG. 4 is a block diagram illustrating an example of a driving controller included in a display device according to some embodiments.

FIG. 4 is a block diagram illustrating an example of a driving controller included in a display device according to some embodiments.

Referring to FIG. 4, a driving controller **200*b* may include a line unit calculator 210, a line load calculator 220, a grayscale controller 230, a maximum grayscale calculator 240*a*, a power voltage code generator 250*a*, a load reference value calculator 260*a*, and a line load comparator 270*a***.

The maximum grayscale calculator **240*a*, the power voltage code generator 250*a*, the load reference value calculator 260*a*, and the line load comparator 270*a* in FIG. 4 may be substantially the same as the maximum grayscale calculator 240, the power voltage code generator 250, the load reference value calculator 260, and the line load comparator 270 in FIG. 3, respectively. The descriptions repeated with or overlapping with descriptions of FIG. 3** will be omitted in the interest of brevity.

The line unit calculator 210 may receive the input image data IMG, may calculate the sum LS_L of grayscales of each of the plurality of line images based on the input image data IMG, and may calculate the sum LS_F of grayscales of each of the plurality of frame images based on the input image data IMG. For example, each frame image may include line images, each line image may include pixel images each of which corresponds to one pixel, and each pixel image may have a pixel value or grayscale. The line unit calculator 210 may calculate the sum of grayscales of one line image by adding up grayscales of pixel images included in one line image, and similarly may calculate the sums of the grayscales of the plurality of line images. The line unit calculator 210 may calculate the sum of grayscales of one frame image by adding up grayscales of line images included in one frame image, and similarly may calculate the sums of the grayscales of the plurality of frame images.

The line load calculator 220 may calculate the plurality of frame loads LD_F associated with the plurality of frame images based on the sum LS_F of grayscales of each of the plurality of frame images. For example, each of the plurality of frame loads LD_F may have a value between about 0% and about 100%. For example, when a first frame image among the plurality of frame images is a full black image, a first frame load associated with the first frame image among the plurality of frame loads LD_F may be about 0%. For example, when a second frame image among the plurality of frame images is a full white image, a second frame load associated with the second frame image among the plurality of frame loads LD_F may be about 100%. Although aspects of some embodiments are described based on that the plurality of frame loads LD_F are calculated using the sum LS_F of grayscales of each of the plurality of frame images, embodiments according to the present disclosure are not limited thereto. For example, each frame load may be calculated using an average of grayscales of each frame image.

The line load calculator 220 may calculate the plurality of line loads LD_L associated with the plurality of line images based on the sum LS_L of the grayscales of each of the plurality of line images. For example, each of the plurality of line loads LD_L may have a value between about 0% and about 100%. For example, when a first line image among the plurality of line images is a full black image, a first line load associated with the first line image among the plurality of line loads LD_L may be about 0%. For example, when a second line image among the plurality of line images is a full white image, a second line load associated with the second line image among the plurality of line loads LD_L may be about 100%. Although aspects of some embodiments are described based on that the plurality of line loads LD_L are calculated using the sum LS_L of grayscales of each of the plurality of line images, embodiments according to the present disclosure are not limited thereto. For example, each line load may be calculated using an average of grayscales of each line image.

The grayscale controller 230 may output the scale factor SF based on the plurality of frame loads LD_F. For example, the grayscale controller 230 may control or adjust the scale factor SF such that the product of the plurality of frame loads LD_F and the luminance of the display panel 100 corresponds to a constant value. The grayscale controller 230 may perform the first operation based on the first signal SFDS. For example, the first operation may represent an operation of setting the scale factor SF to a value less than or equal to one to maintain or reduce the grayscale. For example, when the scale factor SF is set to about 0.5 based on a line load of a first line image, grayscale of a second line image subsequent to the first line image may be reduced by a half.

Figure 5:
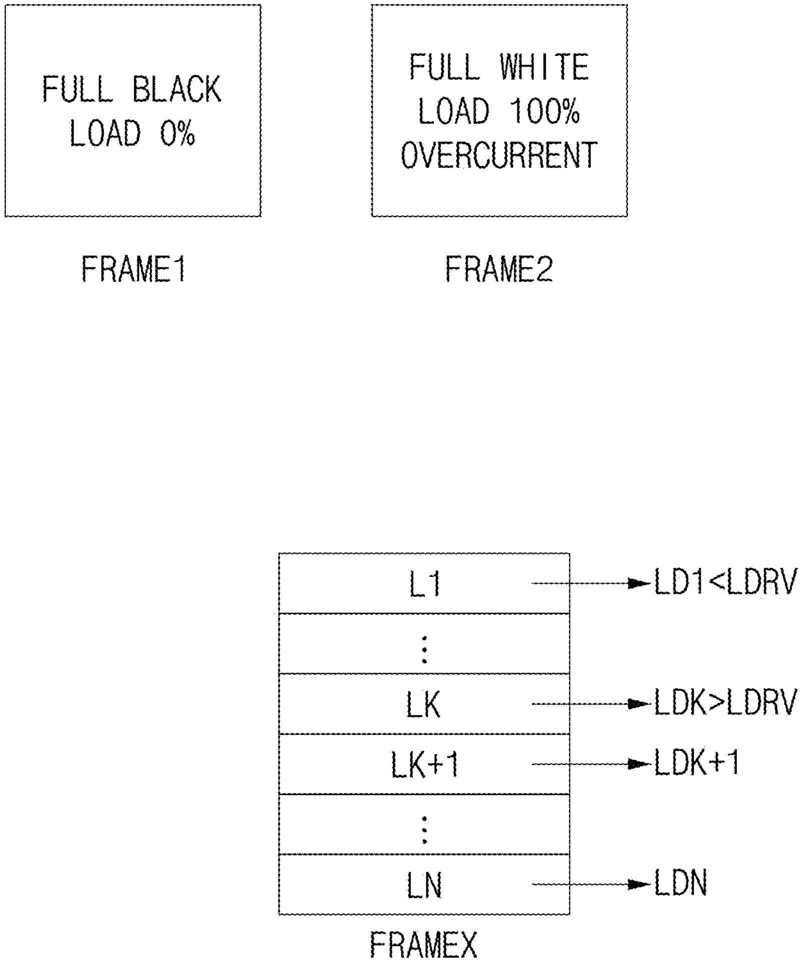
FIG. 5 is a diagram illustrating an example of frame images and line images displayed by a display device according to some embodiments.

FIG. 5 is a diagram illustrating an example of frame images and line images displayed by a display device according to some embodiments.

Referring to FIG. 5, when a first frame image FRAME1 displayed on the display panel 100 based on the input image data IMG is a full black image, a frame load of the first frame image FRAME1 may be about 0%. In this example, the power current flowing through the display panel 100 when the first frame image FRAME1 is displayed may not be the overcurrent.

When a second frame image FRAME2 subsequent to the first frame image FRAME1 is a full white image, a frame load of the second frame image FRAME2 may be about 100%. In this example, the power current flowing through the display panel 100 when the second frame image FRAME2 is displayed may be the overcurrent. Therefore. the first operation or the second operation may be performed to reduce the power current.

For example, an X-th image FRAMEX may contain N line images L1, . . . , LK, LK+1 . . . , LN, where each of X and N is a positive integer. For example, N line loads LD1, . . . , LDK, LDK+1, . . . , LDN associated with the N line images L1, . . . , LK, LK+1 . . . , LN may be sequentially calculated. For example, the first line load LD1 associated with the first line image L1 may be less than the load reference value LDRV, and the K-th line load LDK associated with the K-th line image LK displayed later than the first line image L1 may be greater than the load reference value LDRV, where K is a positive integer greater than one and less than N. For example, there may be a delay corresponding to one line image in calculating the K-th line load LDK. Accordingly, the first operation or the second operation may be performed when the (K+1)-th line image LK+1 is displayed. According to some embodiments, an accumulated value of the plurality of line loads may be used to compare with the load reference value LDRV.

The net power controller 201 may perform the first operation based on the first signal SFDS, and the power voltage code generator 250 may perform the second operation based on the second signal VDS.

Figure 6:
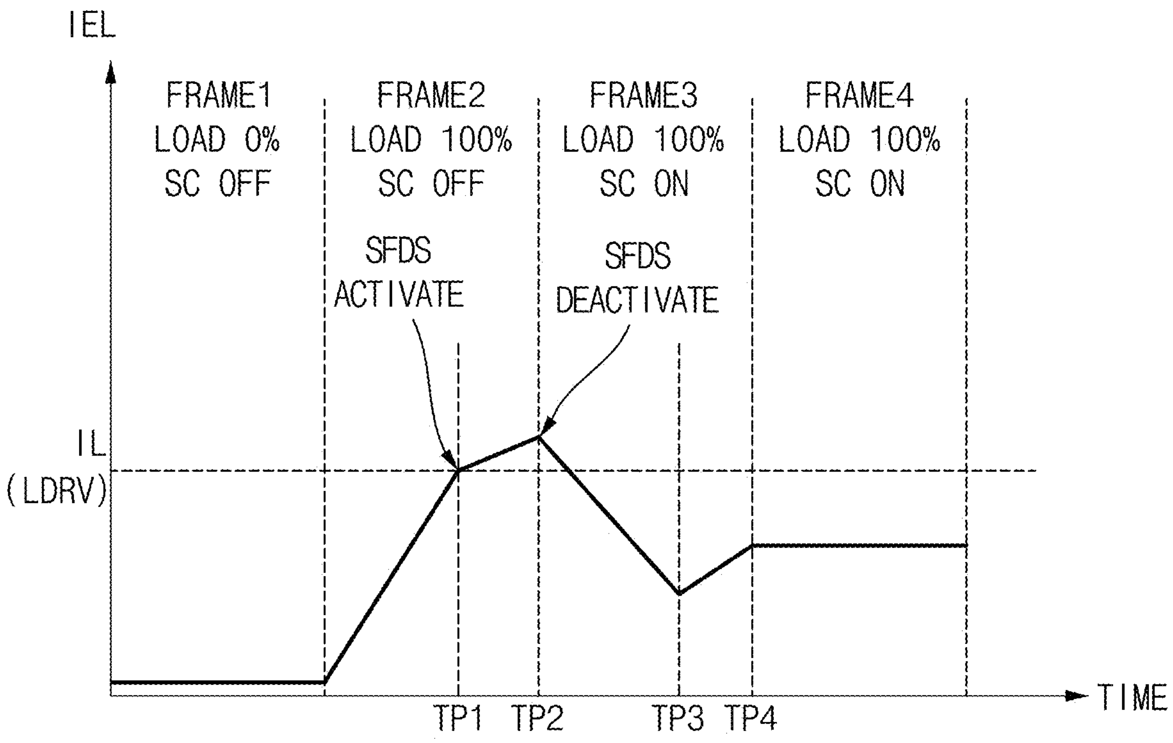
FIG. 6 is a diagram for describing a first operation performed by a display device according to some embodiments.

FIG. 6 is a diagram for describing a first operation performed by a display device according to some embodiments.

Referring to FIG. 6, an example of the change in a power current IEL flowing through the display panel 100 when the first signal SFDS is activated is illustrated.

For example, a frame load associated with a first frame image FRAME1 may be about 0%, and thus a net power adjustment operation SC may not be performed. A plurality of line loads associated with a plurality of line images included in the first frame image FRAME1 may be less than or equal to the load reference value LDRV (or a reference current IL), and the power current IEL when the first frame image FRAME1 is displayed may not be the overcurrent. Therefore, the driving controller 200 may not generate or activate the first signal SFDS. For example, the scale factor of the first frame image FRAME1 may be about 1.

For example, a frame load associated with a second frame image FRAME2 subsequent to the first frame image FRAME1 may be about 100%. However, the net power adjustment operation SC may not be performed due to a delay required to determine the frame load, and the scale factor of the second frame image FRAME2 may be 1 until before the first operation is performed. For example, the data voltage may increase by the frame load associated with the second frame image FRAME2. Because the data voltage is sequentially applied to the pixels included in the display panel 100 in units of rows, the driving current of the pixels may sequentially increase in units of rows. Therefore, the power current IEL when the second frame image FRAME2 is displayed may increase.

At a first time point TP1, a plurality of line loads associated with a plurality of line images included in the second frame image FRAME2 may be greater than the load reference value LDRV, and the power current IEL when the second frame image FRAME2 is displayed may be the overcurrent. For example, the driving controller 200 may generate or activate the first signal SFDS, and a time point at which the first signal SFDS is generated and activated may be the first time point TP1.

From the first time point TP1, the scale factor of the second frame image FRAME2 may decrease by the first operation. As the scale factor of the second frame image FRAME2 decreases, the data voltage may decrease. Because the data voltage is sequentially applied to the pixels in units of rows, the driving current of the pixels may sequentially decrease in units of rows. Accordingly, an increasing slope of the power current IEL may decrease from the first time point TP1 to a second time point TP2, which represents a start time point of the third frame image FRAME3.

For example, a frame load associated with a third frame image FRAME3 subsequent to the second frame image FRAME2 may be about 100%. Because the frame load associated with the second frame image FRAME2 that is a previous frame image is about 100%, the net power adjustment operation SC may be performed during a time interval corresponding to the third frame image FRAME3 that is a present frame image. The first signal SFDS may be deactivated at the second time point TP2, and the first operation may not be performed during a time interval corresponding to the third frame image FRAME3, which is a next frame image with respect to the first time point TP1 at which the overcurrent is detected. In other words, the scale factor only by net power adjustment operation SC may be applied from the second time point TP2. The scale factor of the third frame image FRAME3 may be calculated from the second frame image FRAME2.

The scale factor of the third frame image FRAME3 may decrease by the net power adjustment operation SC. As the scale factor of the third frame image FRAME3 decreases, the data voltage may decrease. Because the data voltage is sequentially applied to the pixels in units of rows, the driving current of the pixels may sequentially decrease in units of rows.

For example, the data voltage at the first time point TP1 may remain, and then the data voltage may be changed at a third time point TP3. In this example, the scale factor by the net power adjustment operation SC may be greater than the scale factor by the first operation. For example, the data voltage based on the scale factor of the second frame image FRAME2 at the first time point TP1 may be less than the data voltage based on the scale factor of the third frame image FRAME3. From the third time point TP3, the data voltage may increase, and the power current IEL may increase.

For example, a frame load associated with a fourth frame image FRAME4 subsequent to the third frame image FRAME3 may be about 100%. Because the frame load associated with the third frame image FRAME3 that is a previous frame image is about 100%, the net power adjustment operation SC may be performed during a time interval corresponding to the fourth frame image FRAME4 that is a present frame image. Therefore, from a fourth time point TP4, which is a start time point of the fourth frame image FRAME4, the power current IEL may be maintained to a constant level.

Figure 7:
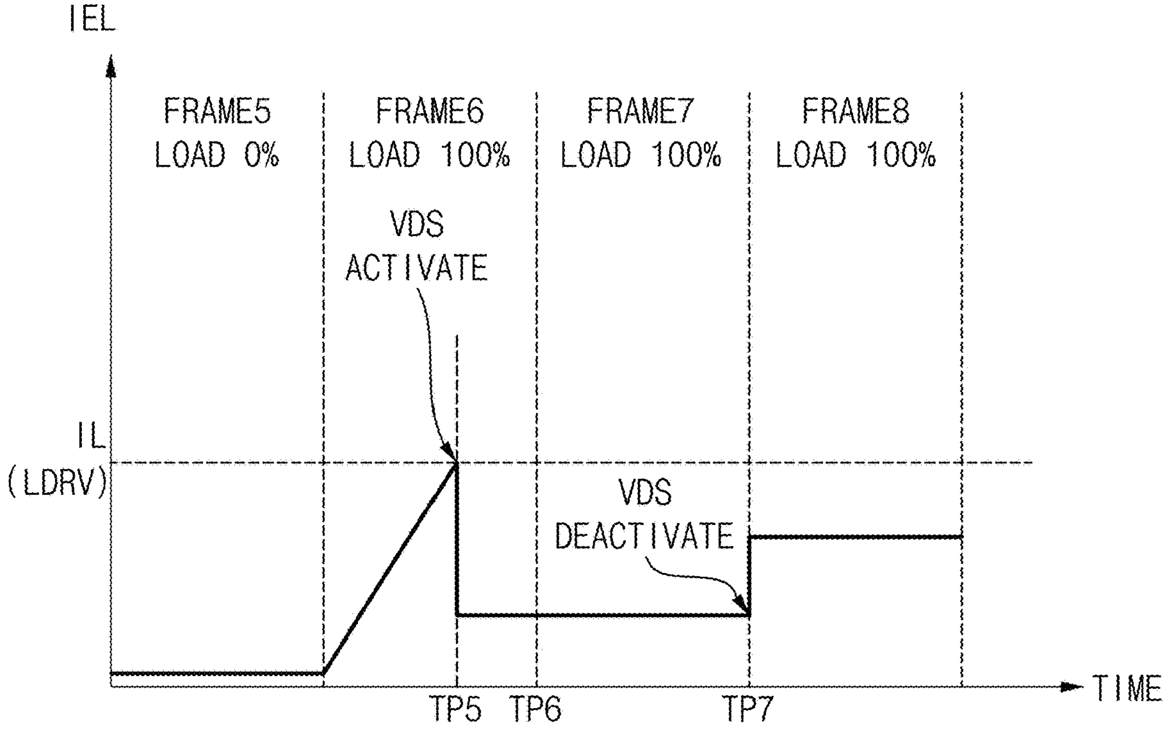
FIG. 7 is a diagram for describing a second operation performed by a display device according to some embodiments.

FIG. 7 is a diagram for describing a second operation performed by a display device according to some embodiments.

Referring to FIG. 7, an example of the change in a power current IEL flowing through the display panel 100 when the second signal VDS is activated is illustrated. The descriptions repeated with or overlapping with descriptions of FIG. 6 will be omitted in the interest of brevity.

For example, a frame load associated with a fifth frame image FRAME5 may be about 0%. A plurality of line loads associated with a plurality of line images included in the fifth frame image FRAME5 may be less than or equal to the load reference value LDRV (or the reference current IL), and the power current IEL when the fifth frame image FRAME5 is displayed may not be the overcurrent. Therefore, the driving controller 200 may not generate or activate the second signal VDS.

For example, a frame load associated with a sixth frame image FRAME6 subsequent to the fifth frame image FRAME5 may be about 100%. For example, the data voltage may increase by the frame load associated with the sixth frame image FRAME6. Because the data voltage is sequentially applied to the pixels included in the display panel 100 in units of rows, the driving current of the pixels may sequentially increase in units of rows. Therefore, the power current IEL when the sixth frame image FRAME6 is displayed may increase.

At a fifth time point TP5, a plurality of line loads associated with a plurality of line images included in the sixth frame image FRAME6 may be greater than the load reference value LDRV, and the power current IEL when the sixth frame image FRAME6 is displayed may be the overcurrent. For example, the driving controller 200 may generate or activate the second signal VDS, and a time point at which the second signal VDS is generated and activated may be the fifth time point TP5.

From the fifth time point TP5, the voltage level of the power voltage of the sixth frame image FRAME6 may decrease by the second operation. Unlike the first operation, the data voltage may decrease to a user-intended voltage level immediately when the second operation is performed. Accordingly, the power current IEL may decrease with a relatively sharp slope.

According to some embodiments, to prevent or reduce instances of the change in luminance of the display panel 100 being recognized by the user, the second operation may maintain longer than the first operation by a time interval corresponding to one frame image. For example, the second signal VDS may not be deactivated at a sixth time point TP6, which represents a start time point of a seventh frame image FRAME7 subsequent to the sixth frame image FRAME6, and may be deactivated at a seventh time point TP7, which represents a start time point of an eighth frame image FRAME8 subsequent to the seventh frame image FRAME7.

Figure 8:
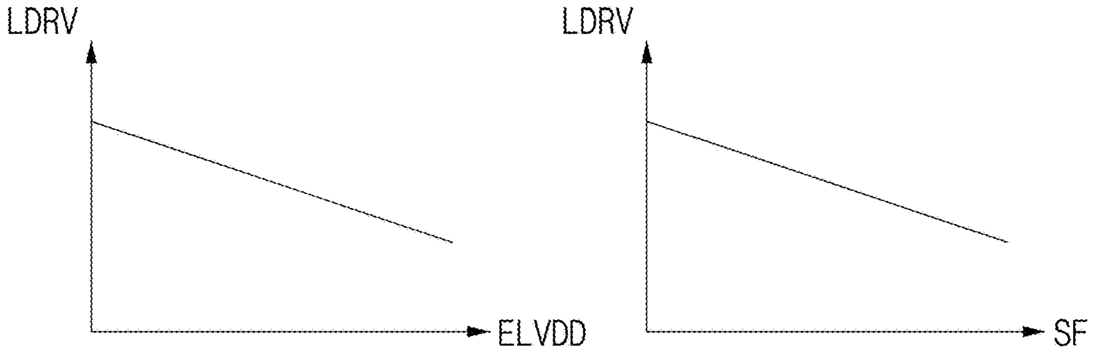
FIG. 8 is a diagram for describing a load reference value look-up table used in a display device according to some embodiments.

FIG. 8 is a diagram for describing a load reference value look-up table used in a display device according to some embodiments.

Referring to FIG. 8, an example of a relationship between the power voltage ELVDD and the load reference value LDRV is illustrated, and an example of a relationship between the scale factor SF and the load reference value LDRV is illustrated.

According to some embodiments, the load reference value look-up table LDRV LUT may be set such that the load reference value LDRV is inversely proportional to the voltage level of the power voltage ELVDD and the scale factor SF.

For example, as the voltage level of the power voltage ELVDD increases, the load reference value LDRV may decrease. For example, when the voltage level of the power voltage ELVDD is relatively high, the current level of the power current flowing through the display panel 100 may be relatively low. For example, the load may be proportional to the current level of the power current. Therefore, to efficiently control the power current, the higher the voltage level of the power voltage ELVDD, the lower the load reference value LDRV may be set.

For example, as the scale factor SF increases, the load reference value LDRV may decrease. For example, when the scale factor SF is relatively large, the gain may be relatively high, and thus the current level of the power current corresponding to the load may be relatively high. For example, when the scale factor SF is about 0.8 and the load is about 100%, the current level of the power current corresponding to the load may be higher than when the scale factor SF is about 0.5 and the load is about 100%. Therefore, to efficiently control the power current, the larger the scale factor SF, the lower the load reference value LDRV may be set.

Figure 9:
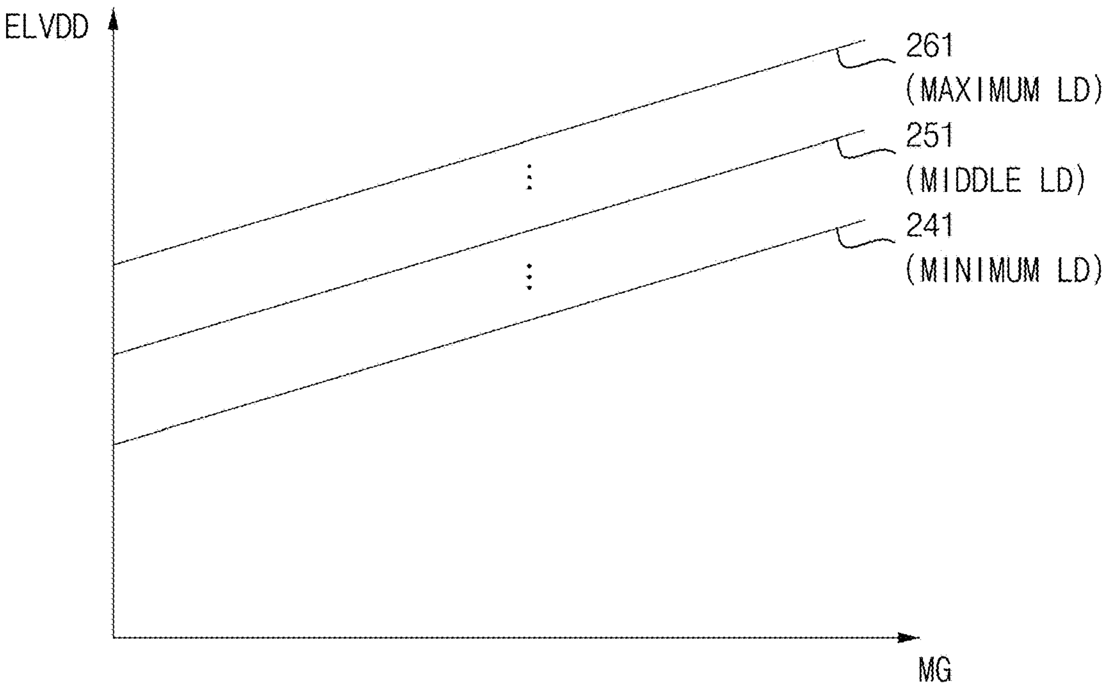
FIG. 9 is a diagram for describing a voltage code look-up table used in a display device according to some embodiments.

FIG. 9 is a diagram for describing a voltage code look-up table used in a display device according to some embodiments.

Referring to FIG. 9, an example of a relationship between the maximum grayscale MG and the power voltage ELVDD is illustrated, and an example of a relationship between the frame load LD and the power voltage ELVDD is illustrated.

According to some embodiments, the voltage code look-up table VCODE LUT may be set such that the voltage level of the power voltage ELVDD increases as the frame load LD increases, and such that the voltage level of the power voltage ELVDD increases as the maximum grayscale MG increases.

For example, in a case of the minimum load MINIMUM LD (e.g., a full black image), the voltage level of the power voltage ELVDD may be determined along a first voltage level line 241. For example, in a case of the middle load MIDDLE LD, the voltage level of the power voltage ELVDD may be determined along a second voltage level line 251 that is higher than the first voltage level line 241. For example, in a case of the maximum load MAXIMUM LD (e.g., a full white image), the voltage level of the power voltage ELVDD may be determined along a third voltage level line 261 that is higher than the second voltage level line 251. In addition, in each of the voltage level lines 241, 251 and 261, the voltage level may increase as the maximum grayscale MG increases. For example, the middle load MIDDLE LD may be an arbitrary load between the maximum load MAXIMUM LD and the minimum load MINIMUM LD.

Figure 10:
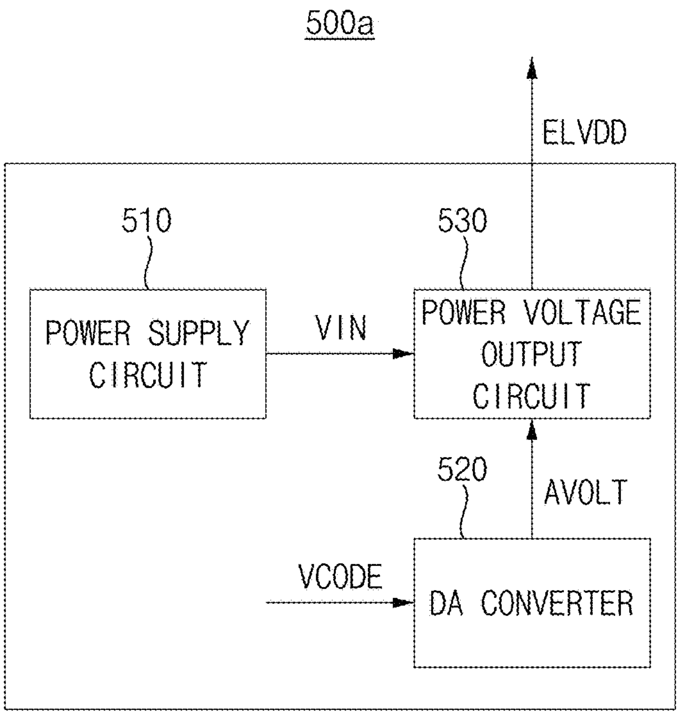
FIG. 10 is a block diagram illustrating an example of a power voltage generator included in a display device according to some embodiments.

FIG. 10 is a block diagram illustrating an example of a power voltage generator included in a display device according to some embodiments.

Referring to FIG. 10, a power voltage generator 500*a* may include a power supply circuit 510, a digital-to-analog (DA) converter 520, and a power voltage output circuit 530.

The power supply circuit 510 may provide an input voltage VIN to the power voltage output circuit 530. For example, the power supply circuit 510 may be a switching mode power supply (SMPS) circuit.

The DA converter 520 may generate a compensation voltage AVOLT (e.g., an analog voltage) based on the power voltage code VCODE, and may output the compensation voltage AVOLT to the power voltage output circuit 530. For example, when the second operation is not performed, the compensation voltage AVOLT may be changed in a cycle of one frame. For example, when the second operation is performed, the compensation voltage AVOLT may be changed immediately after the second operation is performed.

The power voltage output circuit 530 may generate the power voltage ELVDD based on the input voltage VIN and the compensation voltage AVOLT, and may provide the power voltage ELVDD to the display panel 100.

Figure 11:
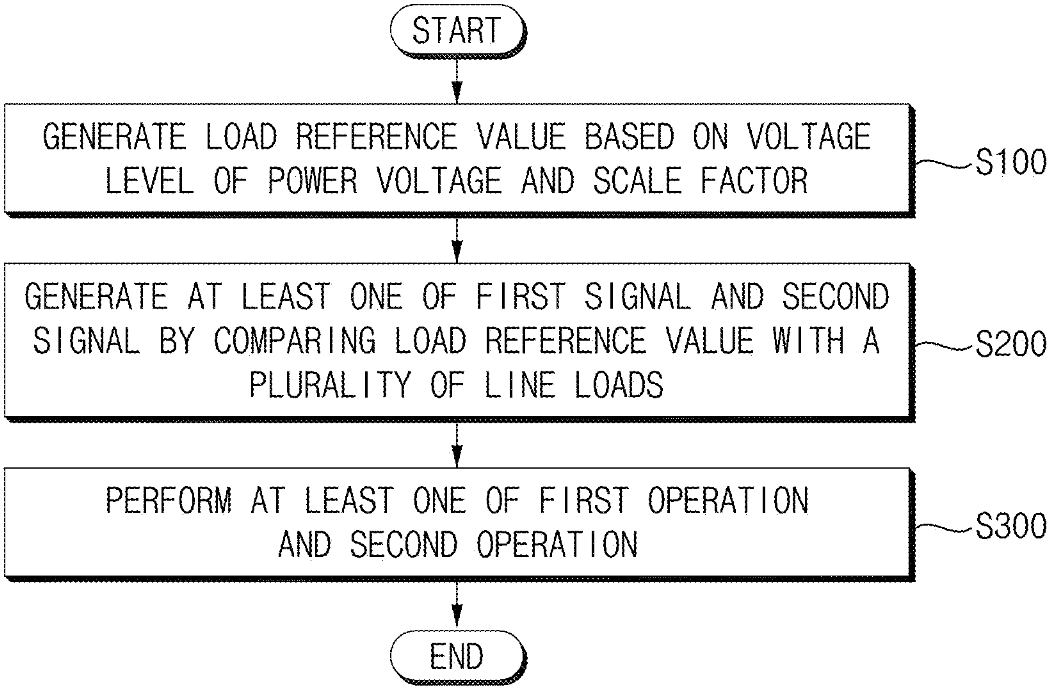
FIG. 11 is a flowchart illustrating a method of driving a display device according to some embodiments.

FIG. 11 is a flowchart illustrating a method of driving a display device according to some embodiments. Although FIG. 11 illustrates various operations of a method of driving a display device, some embodiments may include additional operations or fewer operations, or the order of operations may vary, unless otherwise stated or implied, without departing from the spirit and scope of embodiments according to the present disclosure.

Referring to FIG. 11, in a method of driving a display device according to some embodiments, operations S100, S200 and S300 may be performed by the driving controller 200 in FIG. 1. For example, operation S100 may be performed by the load reference value calculator 260 in FIG. 3. For example, operation S200 may be performed by the line load comparator 270 in FIG. 3. For example, operation S300 may be performed by the net power controller 201 and/or the power voltage code generator 250 in FIG. 3.

A load reference value is generated based on a voltage level of a power voltage and a scale factor (operation S100). For example, the power voltage may be a voltage applied to and for driving a display panel. For example, the scale factor may be an index for adjusting grayscale of a plurality of frame images displayed on the display panel. For example, the load reference value may be a reference value for detecting a condition or situation in which an overcurrent flows through the display panel. For example, the load reference value may be obtained based on the voltage level of the power voltage, the scale factor, and a load reference value look-up table.

At least one of a first signal or a second signal are generated by comparing the load reference value with a plurality of line loads (operation S200). For example, the plurality of line loads may be loads associated with a plurality of line images, and the plurality of line images may be included in each of the plurality of frame images. For example, the first signal may be a signal for performing a first operation. For example, the second signal may be a signal for performing a second operation. According to some embodiments, at least one of the first signal or the second signal may be generated.

At least one of the first operation or the second operation is performed (operation S300). For example, the first operation may be an operation for reducing the scale factor. For example, when the scale factor is reduced, a data voltage of pixels included in the display panel may be reduced. When the data voltage decreases, the power current may decrease. For example, the second operation may be an operation for reducing the voltage level of the power voltage. For example, when the voltage level of the power voltage is reduced, the power current may be reduced. As a result, the first operation and the second operation may be performed for reducing the power current flowing to the display panel.

Figure 12:
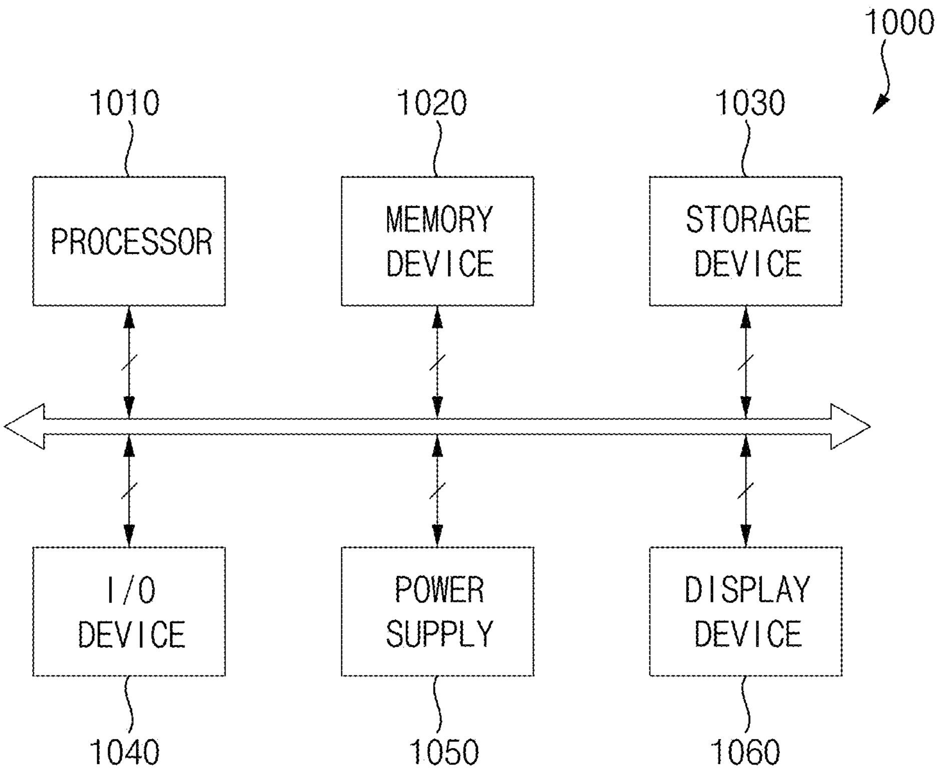
FIG. 12 is a block diagram illustrating an electronic device according to some embodiments.
Figure 13:
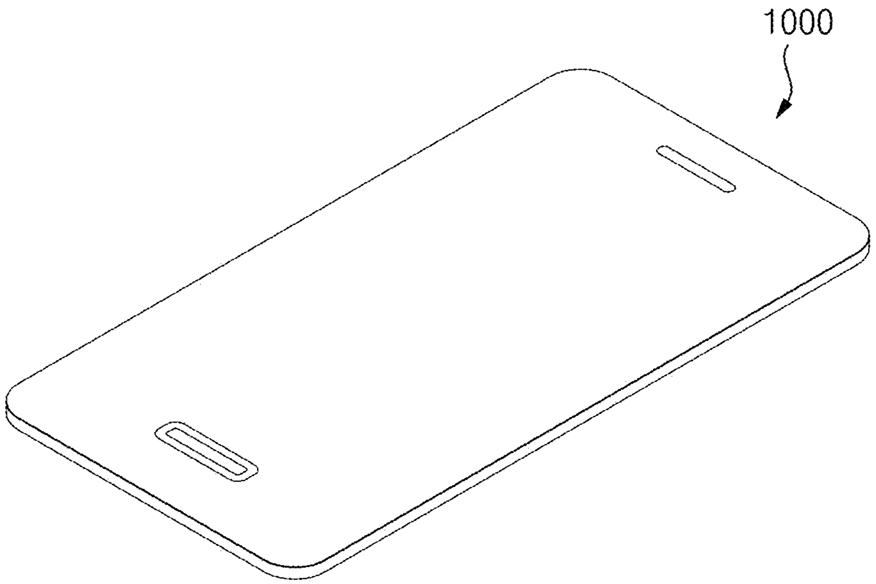
FIG. 13 is a diagram illustrating an example in which an electronic device of FIG. 12 is implemented as a smart phone.

FIG. 12 is a block diagram illustrating an electronic device according to some embodiments. FIG. 13 is a diagram illustrating an example in which an electronic device of FIG. 12 is implemented as a smart phone.

Referring to FIGS. 12 and 13, an electronic device 1000 may include a processor 1010, a memory device 1020, a storage device 1030, an input/output (I/O) device 1040, a power supply 1050, and a display device 1060. For example, the display device 1060 may be the display device according to some embodiments. According to some embodiments, the electronic device 1000 may further include a plurality of ports for communicating with a video card, a sound card, a memory card, a universal serial bus (USB) device, other electronic devices, etc.

According to some embodiments, as illustrated in FIG. 13, the electronic device 1000 may be implemented as a smart phone. However, embodiments according to the present disclosure are not limited thereto. For example, the electronic device 1000 may be implemented as a cellular phone, a video phone, a smart pad, a smart watch, a tablet personal computer (PC), a car navigation system, a computer monitor, a laptop, a head mounted display (HMD) device, etc.

The processor 1010 may perform various computing functions. For example, the processor 1010 may be a microprocessor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc. The storage device 1030 may include a solid state drive (SSD) device, a hard disk drive (HDD) device, a CD-ROM device, etc.

The I/O device 1040 may include an input device such as a keyboard, a keypad, a mouse device, a touch pad, a touch screen, etc., and an output device such as a printer, a speaker, etc. According to some embodiments, the display device 1060 may be included in the I/O device 1040. The power supply 1050 may provide power for operations of the electronic device 1000. The display device 1060 may be coupled to other components via the buses or other communication links.

The embodiments may be applied to various devices and/or systems including the display devices. For example, the embodiments may be applied to systems such as a personal computer (PC), a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of embodiments according to the present disclosure and is not to be construed as limiting thereof. Although aspects of some embodiments have been described, those skilled in the art will readily appreciate that many modifications are possible in the disclosed embodiments without materially departing from the novel teachings and characteristics of embodiments according to the present disclosure. Accordingly, all such modifications are intended to be included within the spirit and scope of embodiments according to the present disclosure as defined in the claims, and their equivalents. Therefore, it is to be understood that the foregoing is illustrative of various disclosed embodiments and is not to be construed as limited to the specific disclosed embodiments, and that modifications to the disclosed embodiments, as well as other embodiments, are intended to be included within the spirit and scope of the appended claims, and their equivalents.

What is claimed is:

1. A display device comprising:
- a display panel configured to display a plurality of frame images based on input image data;
- a power voltage generator configured to provide a power voltage to the display panel; and
- a driving controller configured to:
  - generate a load reference value based on a voltage level of the power voltage and a scale factor for adjusting grayscales of the plurality of frame images;
  - generate at least one of a first signal or a second signal by comparing the load reference value with a plurality of line loads associated with a plurality of line images; and
  - perform at least one of a first operation for reducing the scale factor based on the first signal or a second operation for reducing the voltage level of the power voltage based on the second signal, the first signal and the second signal being used for controlling a power current flowing through the display panel, the plurality of line images being included in each of the plurality of frame images.

2. The display device of claim 1, wherein the driving controller includes:
- a net power controller configured to:
  - receive the input image data;
  - output a plurality of frame loads associated with the plurality of frame images;
  - output the plurality of line loads associated with the plurality of line images;
  - output the scale factor based on the plurality of frame loads; and
  - perform the first operation based on the first signal;
- a load reference value calculator configured to output the load reference value based on the scale factor, the voltage level of the power voltage and a load reference value look-up table;
- a line load comparator configured to output at least one of the first signal or the second signal by comparing the load reference value with the plurality of line loads; and
- a power voltage code generator configured to output a power voltage code for determining the voltage level of the power voltage based on the plurality of frame loads, maximum grayscales of the plurality of frame images and a voltage code look-up table, and to perform the second operation for controlling the power voltage code based on the second signal.

3. The display device of claim 2, wherein the net power controller includes:
- a line unit calculator configured to:
  - receive the input image data;
  - calculate a sum of grayscales of each of the plurality of frame images; and
  - calculate a sum of grayscales of each of the plurality of line images;
- a line load calculator configured to:
  - calculate the plurality of frame loads associated with the plurality of frame images based on the sum of the grayscales of each of the plurality of frame images; and
  - calculate the plurality of line loads associated with the plurality of line images based on the sum of the grayscales of each of the plurality of line images; and
- a grayscale controller configured to:
  - output the scale factor based on the plurality of frame loads; and
  - perform the first operation based on the first signal.

4. The display device of claim 2, wherein the load reference value is inversely proportional to the voltage level of the power voltage and the scale factor.

5. The display device of claim 2, wherein the driving controller further includes:
- a maximum grayscale calculator configured to receive the input image data, and to calculate the maximum grayscales of the plurality of frame images.

6. The display device of claim 2, wherein the voltage level of the power voltage is configured to increase as the frame load increases, and
- wherein the voltage level of the power voltage is configured to increase as the maximum grayscale increases.

7. The display device of claim 2, wherein the power voltage generator includes:
- a power supply circuit configured to provide an input voltage;
- a digital-to-analog (DA) converter configured to generate a compensation voltage based on the power voltage code; and
- a power voltage output circuit configured to output the power voltage based on the input voltage and the compensation voltage.

8. The display device of claim 1, further comprising:
- a data driver configured to provide a plurality of data voltages to a plurality of data lines for driving the display panel.

9. The display device of claim 8, wherein the driving controller and the data driver are formed integrally with each other.

10. The display device of claim 1, further comprising:
- a gate driver configured to provide a plurality of gate signals to a plurality of gate lines for driving the display panel.

11. A method of driving a display device including a display panel configured to display a plurality of frame images based on input image data, the method comprising:
- generating a load reference value based on a voltage level of a power voltage provided to the display panel and a scale factor for adjusting grayscales of the plurality of frame images;
- generating at least one of a first signal or a second signal by comparing the load reference value with a plurality of line loads associated with a plurality of line images, the first signal and the second signal being used for controlling a power current flowing through the display panel, the plurality of line images being included in each of the plurality of frame images; and
- performing at least one of a first operation for reducing the scale factor based on the first signal or a second operation for reducing the voltage level of the power voltage based on the second signal.

12. The method of claim 11, wherein generating the load reference value includes:
- receiving the input image data;
- outputting the scale factor based on the input image data;
- outputting a power voltage code for determining the voltage level of the power voltage based on the input image data; and
- outputting the load reference value based on the scale factor, the voltage level of the power voltage corresponding to the power voltage code, and a load reference value look-up table.

13. The method of claim 12, wherein outputting the scale factor includes:

calculating a sum of grayscales of each of the plurality of frame images;

calculating a plurality of frame loads associated with the plurality of frame images based on the sum of the grayscales of each of the plurality of frame images; and obtaining the scale factor based on the plurality of frame loads.

14. The method of claim 13, wherein outputting the power voltage code includes:

calculating maximum grayscales of the plurality of frame images; and obtaining the power voltage code based on the plurality of frame loads, the maximum grayscales of the plurality of frame images, and a voltage code look-up table.

15. The method of claim 14, wherein the voltage level of the power voltage increases as the frame load increases, and wherein the voltage level of the power voltage increases as the maximum grayscale increases.

16. The method of claim 12, wherein the load reference value is inversely proportional to the voltage level of the power voltage and the scale factor.

17. The method of claim 11, wherein generating at least one of the first signal or the second signal includes:

receiving the input image data;

outputting the plurality of line loads based on the input image data;

comparing the plurality of line loads with the load reference value; and outputting at least one of the first signal or the second signal based on the plurality of line loads being greater than or equal to the load reference value.

18. The method of claim 17, wherein outputting the plurality of line loads includes:

calculating a sum of grayscales of each of the plurality of line images; and calculating the plurality of line loads associated with the plurality of line images based on the sum of the grayscales of each of the plurality of line images.

19. The method of claim 11, wherein the scale factor is immediately reduced based on the first operation being performed based on the first signal.

20. The method of claim 11, wherein performing at least one of the first operation or the second operation includes:

generating a power voltage code for reducing the voltage level of the power voltage based on the second signal, and wherein the voltage level of the power voltage is immediately reduced in response to the second operation being performed based on the power voltage code.

* * * * *